United States Patent [19]
Zentis

[11] 3,747,770
[45] July 24, 1973

[54] FILTER SCREEN
[75] Inventor: Ramon J. Zentis, McKean, Pa.
[73] Assignee: Zurn Industries, Inc., Erie, Pa.
[22] Filed: June 20, 1969
[21] Appl. No.: 835,078

[52] U.S. Cl. ............... 210/402, 210/489, 210/497, 210/499
[51] Int. Cl. ............................................. B01d 33/06
[58] Field of Search ............ 210/402, 489, 497–499, 210/403, 404

[56] References Cited
UNITED STATES PATENTS
2,462,604  2/1949  Boucher ........................ 210/499 X
2,677,466  5/1954  Lowe ................................ 210/489
2,910,183  10/1959  Hayes ............................ 210/498 X
3,165,473  1/1965  Pall et al. ........................... 210/510
3,426,910  2/1969  Winzen .......................... 210/499 X

*Primary Examiner*—Samih N. Zaharna
*Assistant Examiner*—F. F. Calvetti
*Attorney*—McNenny, Farrington, Pearne and Gordon

[57]  ABSTRACT

There is provided an improved filter medium characterized by a very fine mesh woven wire straining fabric supported on a relatively large open mesh grid having substantially planar faces and cohered to the grid by sintering and without the aid of adhesives.

9 Claims, 6 Drawing Figures

PATENTED JUL 24 1973

3,747,770

INVENTOR
RAMON J. ZENTIS

BY
McNenny, Farrington, Pearne & Gordon
ATTORNEYS

– 3,747,770 –

FILTER SCREEN

BACKGROUND OF THE INVENTION

The use of very fine "micro" mesh woven wire straining fabrics formed from extremely fine stainless steel wire is well known. Reference may be had to the U.S. Pat. to Boucher No. 2,462,604 which fully describes filtering screens possessing these characteristics. The disclosure of that patent is incorporated herein by reference.

In the manufacture of filters for aqueous media, e.g. in sewage treatment, water straining operations, etc., the prior art has utilized large drums which are rotatable, the surface of which is provided with panels of such very fine woven wire mesh straining fabrics as above described. Although this straining fabric can be treated in such a way as to confer thereon remarkable rigidity, it has been found necessary to provide a grid type support having macro openings therein for the screen fabric to minimize breakage of such screens due to flexure occasioned by alternate filtering and backwashing. This occurs on virtually each revolution of the drum supporting such filtering media. The provision of such a grid type support is also necessitated by the possibility of fabric breakage during servicing. Tools and parts are sometimes inadvertently dropped on the fabric causing such breakage. Prior efforts to support screening media of the type described upon a grid have included cementing the screening fabric to the support grid with an adhesive composition, usually an organic material such as an epoxy resin. A workable structure can be produced in such a fashion, but difficulty is encountered with loss of area due to excessive amounts of adhesive utilized in preparing supported screening panels, and ultimate degradation of the adhesive because of exposure to chemicals, elevated temperatures, plant and animal life frequently associated with the aqueous media treated thereby. These factors contribute to loss of efficiency and a high replacement rate of filter panels with the relatively expensive woven wire screening fabrics above described. Also, fine mesh woven wire screening fabric has been supported on coarse mesh woven wire mesh, e.g. 1/16 inch to ¼ inch openings and surfaces which are not "planar" as the term is used herein. However, this mode of supporting a wire fabric to provide a filter medium for water treatment has not proved satisfactory as will be pointed out below.

The present invention provides an improved filter medium characterized by a woven wire screening fabric cohered to a wide mesh supporting grid having substantially planar faces. The area of cohesion is coextensive with the planar surface area of the grid. These media are fabricated by heating the elements in laminar relation to a sintering temperature for the metal compositions involved and for a period of time sufficient to cause the surfaces of the respective layers to become intimately bonded together by cohesion as distinct from adhesion. In a preferred embodiment of the present invention, both the screen and the supporting grid material are formed from stainless steel, e.g. AISI 316 stainless. Instead of stainless steels, nickel alloys, such as monel metal and the Hastelloys may be used. A convenient sintering temperature for 316 stainless steel is in the range of from 2,100° to 2,200° F., e.g. 2,150° F. When these devices are fabricated in accordance with the present invention, there is obtained a supported fine or micro-mesh straining medium which is not only free from the limitations imposed by organic adhesives, but has conferred thereon further desirable characteristics by virtue of the sintering operation. The woven wire screening fabric prior to sintering is quite flexible much as woven cloth formed from organic fibers. After exposure to the sintering operation, the screen itself undergoes sintering such that the warp and weft elements at their respective junctures become cohered to one another, and the flexibility of the screening fabric is greatly reduced giving a structural rigidity snad stability to the open area which resists flexure normally caused by the flow of fluid in opposite directions through the screen on each revolution on a drum. The wire cloth becomes also puncture resistant, and relieves stress thereby improving corrosion resistance.

BRIEF STATEMENT OF INVENTION

Briefly stated, the present invention is in a filter medium consisting of a woven wire screening fabric having micro openings therein cohered to a rigid supporting grid having macro openings therein and having substantially planar faces. The cohesion between the two elements is secured by exposing the elements in contiguous laminar relation to temperatures sufficient to sinter the metals without melting the metals.

The term "rigid" is not used herein in its absolute sense. It contemplates a member which, relative to the wire fabric, is stiff and is capable of rendering the composite of the fabric and grid self-supporting. The term does not mean "inflexible" as will appear. Panels are prepared flat, and when applied to a drum body are sufficiently flexible to conform to the configuration of the outer surface.

The supporting grid is also characterized by substantially planar faces. This means tht the top and bottom surfaces of the grid members defining the openings lie in common, preferably parallel, planes, respectively, throughout their extent. Accordingly, the contact between the fabric and the grid is over a flat surface which is co-extensive with the periphery of each opening. That area of the surface of the grid which is in cohering contact with the fabric is substantially equal to the difference between the overall area of the grid diminished by the open area of the grid. Thus suitable grids include perforated plates and flattened expanded metal grids. Excluded is woven wire mesh.

Woven wire mesh is unsatisfactory for certain purposes, particularly water straining, because contact between a wire fabric and such a wide mesh screen is virtually limited to point contact or isolated small areas of contact. Flexure of the screen in use can destroy the adhesion or the screen itself at such points. Moreover, between the fabric and the wire mesh, pockets are created which trap debris and make adequate washing of a filter medium so constructed difficult and inefficient. When cohesion between the screen and grid is over an area fully bounding the individual openings both these problems are greatly alleviated to the end that filter medium life is extended and filtering efficiency is maintained at a high level for the life of the filter medium. The large mesh of the supporting grid is beneficial in reducing sites for algae growth which can lead to screen blinding and cessation of filtering action.

The filter media of the present invention are formed by placing the rigid screen containing macro openings and substantially planar faces in laminar relation with the woven wire screening fabric, applying a load, albeit relatively light, normal to the plane of the grid uniformly over said grid, and heating the composite to a temperature and for a period of time sufficient to sinter the contacting metals including the junctures between warp and weft elements without melting the same, cooling the composite and removing the filter medium from the pile.

DESCRIPTION OF THE DRAWINGS

Figure 1:
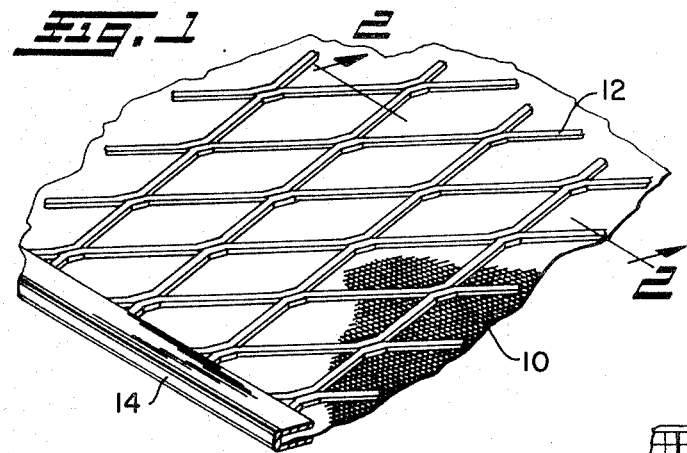
FIG. 1 is a perspective view of a filter medium in accordance with the present invention showing an expanded metal grid having macro openings therein and cohered thereto, a woven wire straining fabric having micro openings.
Figure 2:
FIG. 2 is a cross-sectional view through a filter medium of the present invention.

Referring now more particularly to FIGS. 1 and 2, FIG. 1 shows in perspective a fragment of a filter medium of the present invention. FIG. 2 is a cross-sectional view of the filter medium shown in FIG. 1 as it appears in the plane indicated by the line 2—2 of FIG. 1. The filter medium is composed of a "micro" screen or woven wire fabric 10 which is tightly cohered to a supporting grid 12 having macro openings therein. A specific example of a woven wire fabric suitable for use in accordance with this invention is AISI type 316 stainless steel wire cloth. A bead 14 may be applied to the marginal edges of a rectangular filter medium member after sintering. A marginal bead 14 is not essential to the utility of the filter medium for its intended purpose, and where the panels are relatively small, less than 4 ft. on an edge, there is no real need for marginal reinforcement. However in large size drums, e.g. 25 ft. in diameter, marginal beads 14 will be found desirable and panels up to 8 ft. or more on an edge may be made. In certain instances, H-shaped beads are used between panels to provide intermediately reinforced large panels.

Figure 6:
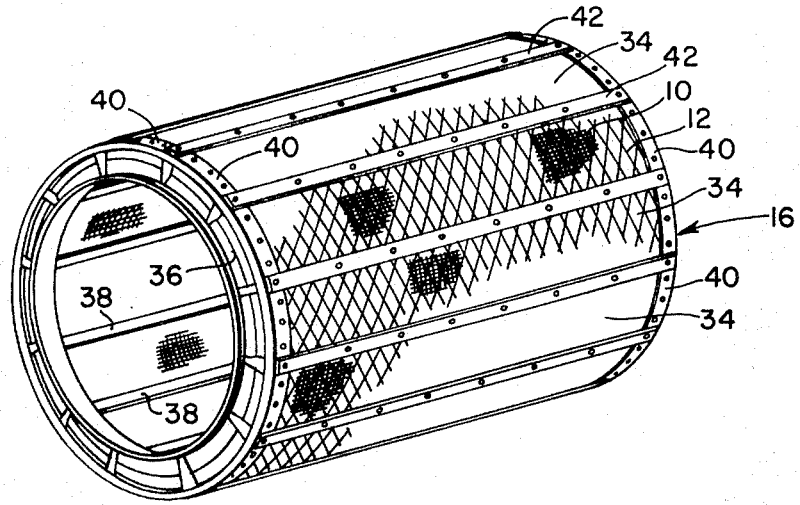
FIG. 6 shows a drum, the outer surface of which is covered with and formed from panels of the filter media of the present invention.

The supporting grid is also metallic and preferably of the same or very similar chemical composition as the woven wire fabric. The openings in the supporting grid are very large in relation to the openings in the screening material and desirably have an area of more than 0.5 sq. in. and preferably at least 1 sq. in. In a preferred embodiment, the supporting grid is a flattened, or calendered, expanded stainless steel grid having a center-to-center dimension between diamond-shaped openings, measured the short distance, of 1.5 in. The thickness of the grid is approximately 0.080 in. Thinner or thicker sections may be used if desired; however, this thickness has been found to provide a satisfactory rigidity to the filter medium segment to enable its attachment about the circumference of a drum 16, such as is shown in FIG. 6.

Figure 4:
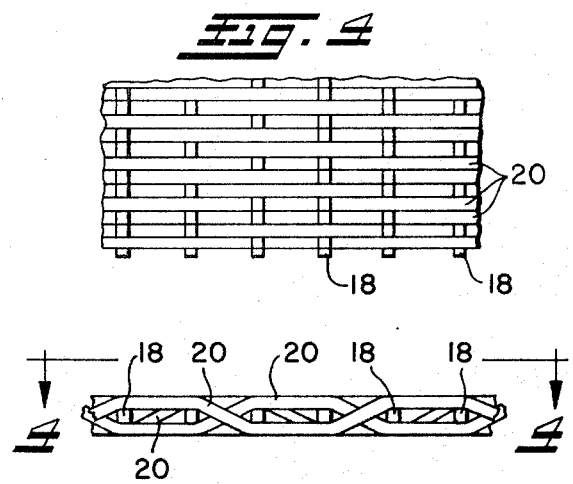
FIG. 4 is a plan view of a section of a typical stainless steel wire fabric of the single warp Dutch twill weave useful as the filter element of the present invention.
Figure 3:
FIG. 3 is an end view on a very much enlarged scale showing a typical single warp Dutch twill weave.

FIGS. 3 and 4 show a single warp Dutch twill weave having 3,600 to upwards of 250,000 openings per sq. in. These openings are of the order of magnitude of from 5 to 300 microns. In a preferred embodiment, the openings are from 21 to 40 microns or smaller. In FIGS. 3 and 4 the warp filaments 18 are filled by weft lines 20 in an over-two, under-two, staggered relationship. This weave is particularly suitable for use in this invention.

Figure 5:
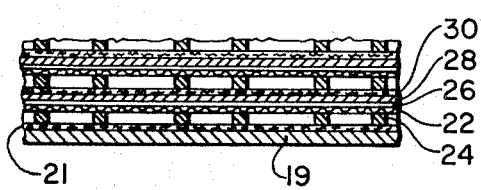
FIG. 5 shows a portion of a typical laminar composite structure or pile for insertion in a sintering furnace to produce the reinforced filter media of the present invention.

The fine mesh straining fabric is continuously bonded to a stainless steel expanded metal sheet of the type above described by a sintering process. For the stainless steels, a sintering temperature of from 2,100° to 2,200° F. is satisfactory. It has been found convenient to effect sintering of the rectangular panels, which normally range from 1 ft. by 2 ft., up to 18 inches × 60 inches in a pile of the type illustrated in FIG. 5. The pile is composed of lamina built up from a base plate 19 of decarbonized steel 1 inch thick having superimposed thereon a layer of refractory fibers 21. The next layer is a grid layer 24 having superimposed thereon and in direct contact therewith a similarly configured rectangularly shaped woven wire fabric layer 22. In direct contact with the wire fabric layer is a thermally stable nonmetallic separator, e.g. ceramic mat layer 26. Covering this assembly there is a steel plate 28 also of decarbonized steel which is about 0.060 inch thick. Steel plates 28 may be thicker, for example ⅛ inch to ¼ inch thick if desired. This constitutes a first tier of lamina, and a second tier is similarly built considering the aforesaid separator steel plate 28 as the first member of the second tier. Thus ceramic fibers 30 are randomly disposed upon steel plate 28. Directly in contact with the ceramic fiber layer 30 is a second grid layer 32, and the pile is thereafter repeated in tiers from three to nine or more times depending upon the capacity of the furnace and the stability of the upper portions of the pile against lateral movement. The top plate, not shown, may also be a 1 inch thick decarbonized steel plate. Weights may be applied to the top plate for added pressure if desired. Normally it is convenient to tackweld the screen onto expanded metal grid at several points to aid in setting the pile in the furnace and preventing lateral displacement of the wire fabric with respect to the grid. A stack or pile is about 4 inches high. It may be composed of a single tier, or a plurality of tiers and be as high as 18 inches or more if stability of the pile can be maintained in the furnace. The furnace is maintained under a hydrogen, or reducing atmosphere, and is brought to sintering temperature in 6 to 8 hours and the pile held at this temperature (2,150° F.) for about 60 minutes. Thereafter, the pile is cooled slowly to 400° F. to 500° F. and then it is removed from the furnace and cooled to room temperature. The entire heat treating cycle requires about 26 hours.

In this manner, the wire fabric is cohered to the supporting grid and intimately bonded thereto by interaction between the respectively contacting surfaces of the woven fiber fabric and the supporting grid. No adhesive is required and the bond which is obtained under these conditions is extremely good. Moreover, at the points of contact between the warp and weft wires within the fabric itself, sintering occurs and a great increase in the rigidity of the fabric and dimensional stability is also experienced.

The advantage of this can be appreciated when it is realized that during the filtering operation, water flows through the filtering medium passing first through the screen 10 and then through the supporting grid which is on the outside of the drum 16. In normal usage of these devices, the filter medium is then submitted to a water backwash which is spray applied, the water first passing through the grid 12 and then through the wire fabric in the opposite direction to that normally employed in filtering. Thus, the screen in a filter drum is subjected to forces normal to the screen surface and moving in opposite radial directions once for each rotation of the drum. Because of the sintering procedure, the screens are less subject to failure adjacent their point of contact with the supporting grid than heretofore possible. The contact normally terminates along a sharp or abrupt edge of the grid, and flexure over such an edge induces rapid failure. With the sintered filter media of this invention, sintering imparts a rigidity to the woven wire mesh and creates a cantilever effect in the fabric that removes the flexure point away from the sharp edge of the grid and thus minimizes fatigue and failure of the medium.

Referring now more particularly to FIG. 6, there is here shown a drum 16 having secured to the outer periphery thereof a plurality of filter elements 34. The drum itself is composed of end rings such as end ring 36 joined to each other by longitudinal members 38. Circumferential members, not shown, may be utilized when the filter drum is longer than, for example, three feet. The longitudinal members 38 provide a means for securing the filter media 34 to the drum surface, and to this end circumferential segments 40 at each end ring 36 may be bolted to the end ring, and longitudinal retaining bars 42 bolted to the longitudinal members 38. The devices of the present invention may be fabricated with marginal beads 14 to protect the marginal edges of the filter media 34 and also to coact with the retaining bars 42 and the circumferential segments 40 for securing the filter media 34 to the drum 16. Each marginal bead is clamped between a member 38 and a bar 42 so that the bolts do not pass through the screening material. Often it is convenient to interpose between the edge of the filter medium 34 and the drum bars 42 and segments 40, a closed cell vinyl adhesive tape about ⅛ inch thick by 0.75 inch wide as a sealing member. Should one of the filter media 34 be damaged in use, it is a relatively simple matter to remove the retaining bars and circumferential segments and to replace the defective member with a new member. By securing the filter media 34 in the manner stated, passage of the securing means or bolts through the screen itself is avoided whereby piercing of the screen and subsequent introduction of points of weakness is obviated. The built-up drum 16 is then mounted in a conventional manner to receive and strain an aqueous system.

There has thus been provided an improved filter medium composed of a fine woven wire fabric having micro openings, i.e., openings of the order of 5 –300 microns. This fabric is cohered to and supported by a grid which is characterized by macro openings, i.e., of the order of 0.5 to 2 sq. in. in size. Cohesion or diffusion bonding of the fabric to the grid is effected by sintering.

What is claimed is:

1. A filter medium consisting of
   a. a woven metallic wire screening fabric having micro openings therein, the size of the openings being in the range of from 5 to 300 microns, in sintered cohered relation to
   b. a rigid supporting grid of flattened expanded metal having macro openings therein, said openings having closed peripheries and the center-to-center dimension of the openings being from 0.5 to 2 inches, and said grid having substantially planar faces, the metals of said screening fabric and said supporting grid being of an equivalent chemical composition and wherein the area of cohesion is coextensive with the confronting surface area of the grid.

2. A filter medium in accordance with claim 1 wherein the screening fabric is stainless steel.

3. A filter medium in accordance with claim 1 wherein the fabric is thermally cohered to said supporting grid.

4. A filter medium in accordance with claim 1 which is rectangularly configured.

5. A filter medium in accordance with claim 1 also including a marginal reinforcing bead along its edges.

6. A filter medium in accordance with claim 5 in which the marginal bead is a U-shaped channel.

7. A filter medium in accordance with claim 1 wherein the woven wire screening fabric is a Dutch twill weave of stainless steel having upwards of 3,600 to 250,000 openings per square inch.

8. In a water straining apparatus including a drum body, the improvement which comprises a filtering surface on said drum body formed from a plurality of adjacently disposed panels each consisting of:
   a. a woven metallic wire screening fabric having micro openings therein, the size of the openings being in the range of from 5 to 300 microns, in sintered cohered relation to
   b. a rigid supporting grid of flattened expanded metal having macro openings therein, said openings having closed peripheries and the center-to-center dimension of the openings being from 0.5 to 2 inches, and said grid having substantially planar faces, and
   c. means coacting with the marginal edges of said panels for securing said panels to said drum body, the metals of said screening fabric and said supporting grid being of an equivalent chemical composition and wherein the area of cohesion is coextensive with the confronting surface area of the grid.

9. A water straining apparatus comprising in combination a cylindrical drum body and a filtering surface on said drum body, said filtering surface being formed from a plurality of adjacently disposed filter media panels covering the cylindrical surface of said drum body and each consisting of:
   a. a woven metallic wire screening fabric having micro openings therein, the size of the openings being in the range of from 5 to 300 microns, in sintered cohered relation to
   b. a rigid supporting grid of flattened expanded metal having macro openings therein, said openings having closed peripheries and the center-to-center dimension of the openings being from 0.5 to 2 inches, and said grid having substantially planar faces, and
   c. means coacting with the marginal edges of said panels for securing said panels to said drum body, the metals of said screening fabric and said supporting grid being of an equivalent chemical composition and wherein the area of cohesion is coextensive with the confronting surface area of the grid.

* * * * *

UNITED STATES PATENT OFFICE
CERTIFICATE OF CORRECTION

Patent No. 3,747,770            Dated July 24, 1973

Inventor(s) Ramon J. Zentis

It is certified that error appears in the above-identified patent and that said Letters Patent are hereby corrected as shown below:

Column 2, line 11, "snad" should be --and--; and line 36, "tht" should be --that--.

Column 4, line 31, "1/4 inch thick" should be --1/2 inch thick--.

Signed and sealed this 25th day of December 1973.

(SEAL)
Attest:

EDWARD M. FLETCHER, JR.      RENE D. TEGTMEYER
Attesting Officer               Acting Commissioner of Patents